United States Patent [19]
Allard

[11] 3,791,912
[45] Feb. 12, 1974

[54] CONSTRUCTION MEMBER

[76] Inventor: Francois Allard, 34, Avenue Leclere, Douai, France

[22] Filed: July 16, 1971

[21] Appl. No.: 163,297

[30] Foreign Application Priority Data
July 22, 1970 France .................. 70.27047
Jan. 15, 1971 France .................. 71.01277

[52] U.S. Cl. .................. 161/160, 52/309, 161/60, 161/123, 161/142, 161/161
[51] Int. Cl. ........ B32b 3/26, B32b 5/18, B32b 5/24
[58] Field of Search ..... 161/60, 160, 142, 161, 123; 52/309

[56] References Cited
UNITED STATES PATENTS
| | | | |
|---|---|---|---|
| 3,043,730 | 7/1962 | Adie | 161/161 |
| 3,640,787 | 2/1972 | Heller | 161/161 |
| 2,826,521 | 3/1958 | Robinson | 161/123 |
| 2,850,890 | 9/1958 | Rubenstein | 161/161 |
| 3,000,144 | 9/1961 | Kitson | 161/123 |
| 3,189,243 | 6/1965 | Lux | 161/161 |
| 3,331,173 | 7/1967 | Elsner | 161/DIG. 4 |
| 3,556,918 | 1/1971 | Lemelson | 161/159 |
| 3,574,104 | 4/1971 | Medler | 161/60 |

Primary Examiner—William J. Van Balen
Attorney, Agent, or Firm—Waters, Roditi, Schwartz & Nissen

[57] ABSTRACT

A construction member comprising a core of plastic foam or expanded plastic material, a covering of plastics resin reinforced with glass fibres bonded to the faces of the core, reinforcing rods being disposed at the connection of the covering with the core such that upon hardening of the resin the reinforcing rods are tightly bonded to the core as well as the covering. The construction member may be formed as a panel, paving slab, flooring member, telephone pole, or silo depending on the desired use.

18 Claims, 18 Drawing Figures

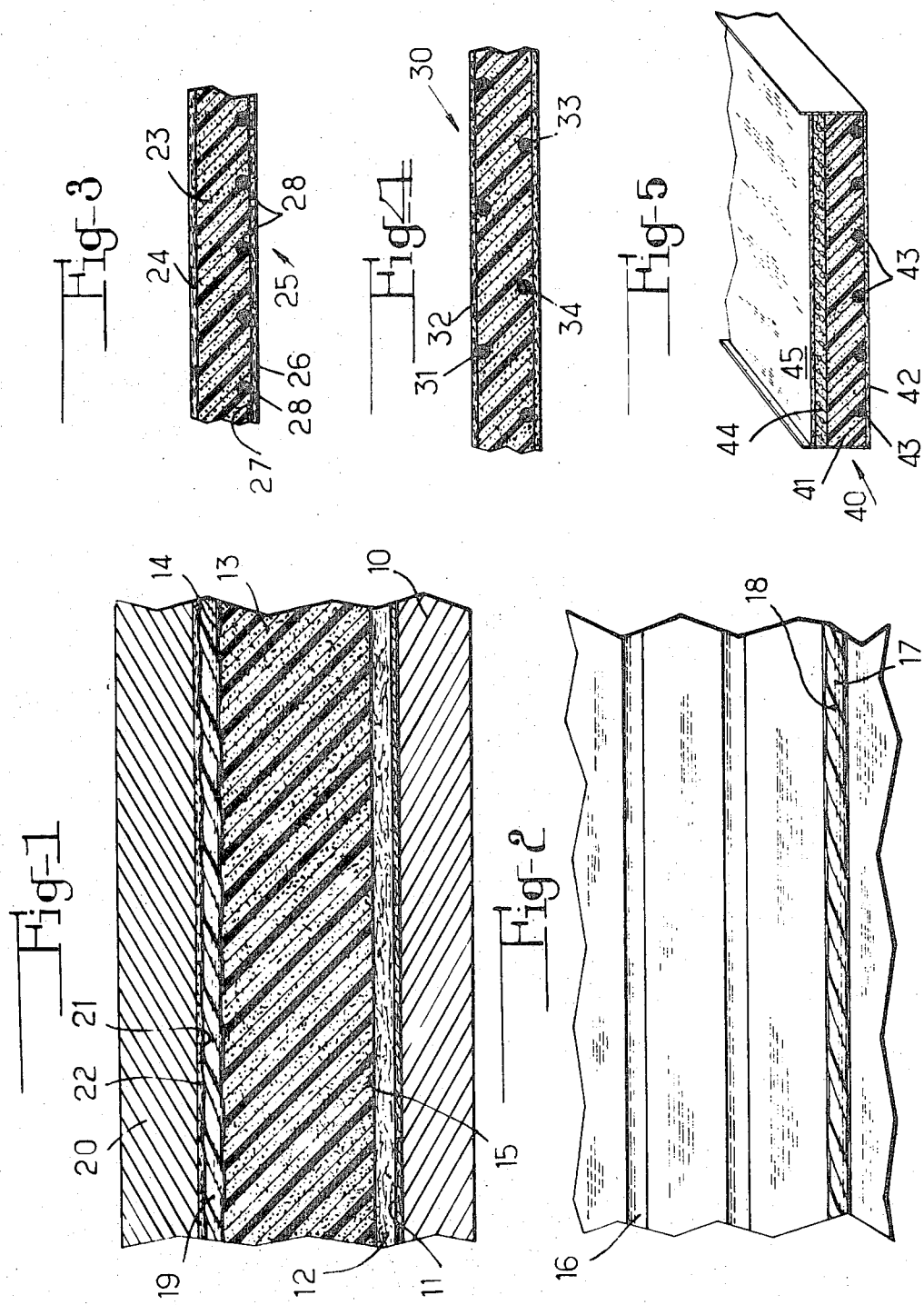

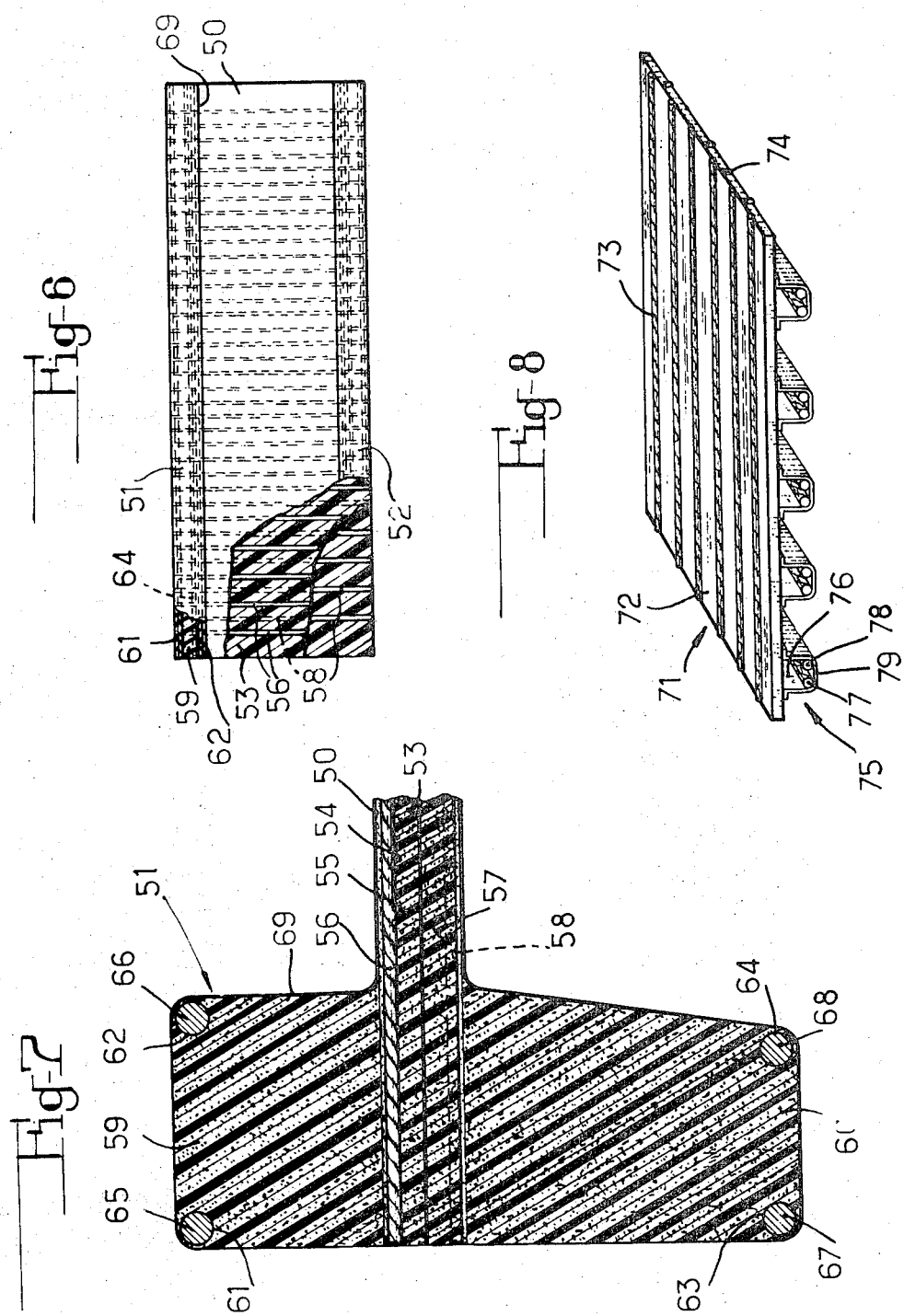

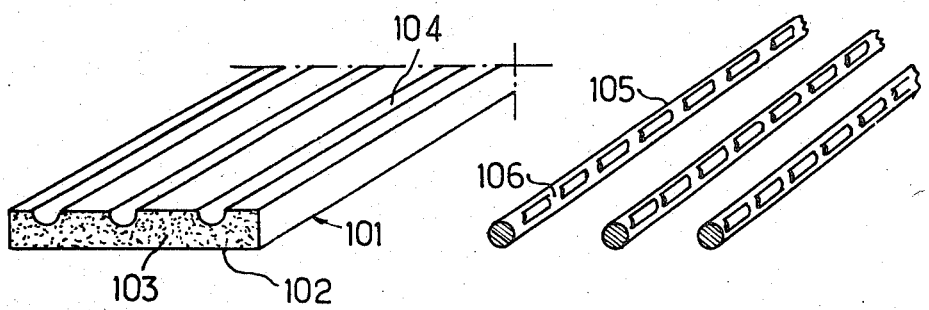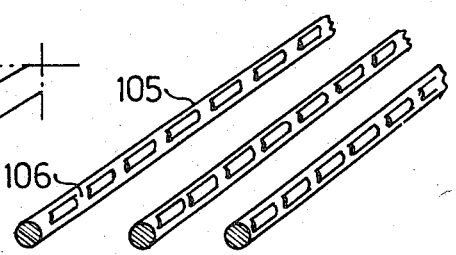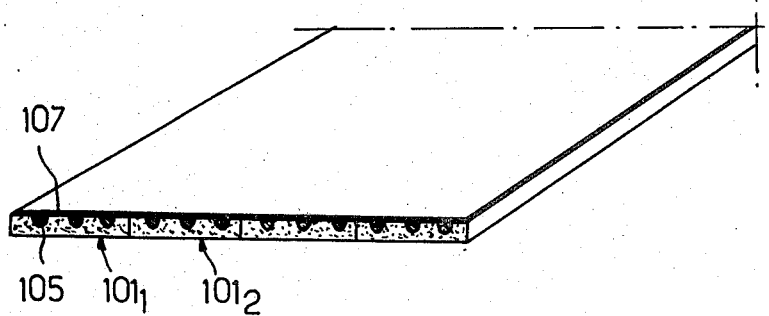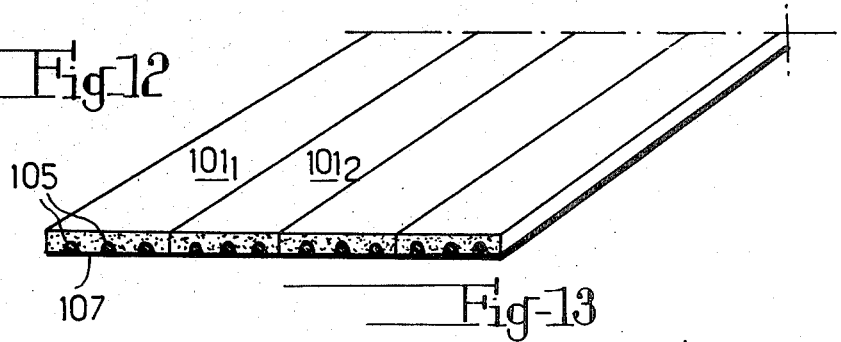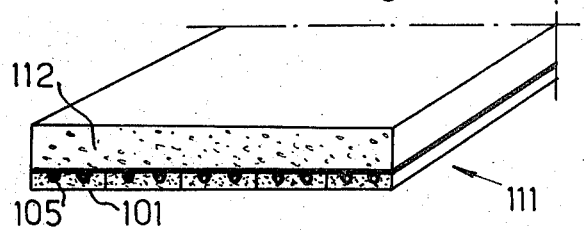

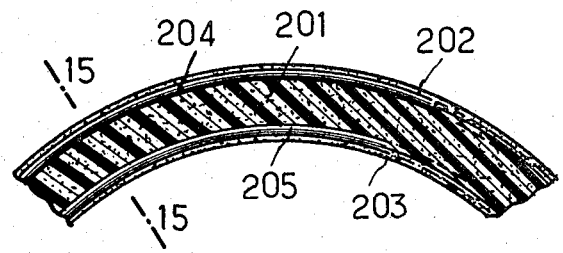
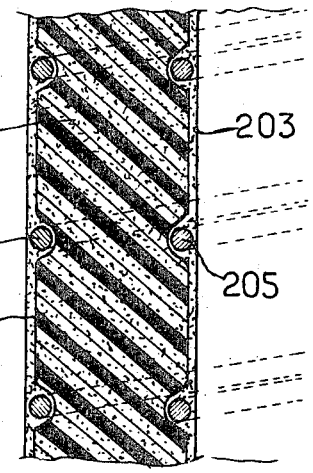
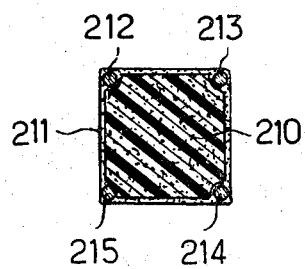
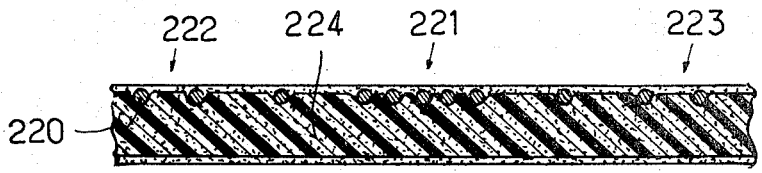
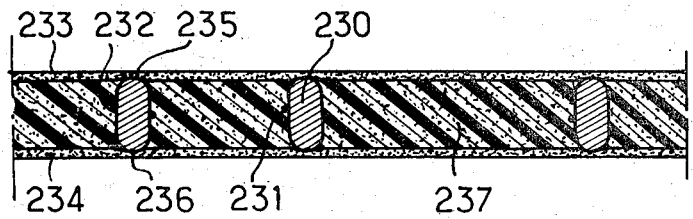

CONSTRUCTION MEMBER

The present invention relates to construction members.

Construction panels of various types having a plastic material base used in the construction of dwellings and the manufacture of containers are known.

The present invention concerns, more particularly, panels having on both sides of a core of expanded or foam plastic material coverings or coatings of a plastic material, preferably polyester reinforced with glass fibres.

These panels have advantageous structural characteristics which are ascribed principally to the tightness of the bond between the coverings the core and which is obtained in the course of manufacture during the hardening of the resin used for the coverings or coatings.

However, such panels particularly when they are of a small thickness have insufficient bending strength for certain applications.

It has been attempted to increase the structural strength of these panels by providing internal stiffening members but the manufacture of such panels is complicated because it is necessary to divide the core into sections that are disposed on both sides of the stiffeners which produces a panel which is not entirely satisfactory.

The present invention is directed to the manufacture of such construction members wherein at the connection between the body of the member and the covering or skin there is provided a metal reinforcing member incorporated therein by the curing of the resin which simultaneously assures the tightness of the bond between the covering and the reinforcing member, the covering and the body as well as the reinforcing member and the body.

The reinforcing members advantageously comprise metal reinforcing rods used in reinforced concrete construction in which the bars are not subjected to prior tension.

Although reinforcing metal members have been used for quite some time in reinforced concrete construction in placing them in the forms into which the aggregate is poured, and eventually the reinforcing members under tension, in a manner so as to be fixed therein upon the hardening of the concrete, it was not seen how to use such reinforcing members in panel members of the above described type in which the core of body is made of preformed plates of expanded plastic material in which such reinforcing members could not be arranged, no less be fixed to the core without unacceptable complications.

The present invention overcomes this difficulty by incorporating the reinforcing members in the covering or coating, or skin, and takes advantage of the fact that during the manufacture of the panel, the covering is formed from a resin which is not yet solidified and includes flexible glass fibres disposed in several layers.

After the polymerization of the resin, the reinforcing member is perfectly fixed to the elements constituting the covering or coating which explains the improved structural characteristics of the panel thus formed.

In a construction member according to the invention, the body or core of expanded material or foam effectively resists the shearing stresses and for certain shapes further prevents the composite covering from buckling or busting.

The covering or skin is itself a composite or layered material having a very small thickness and collects and transmits the shearing stress.

The reinforcement provides the member with qualities resulting from its excellent modulus of elasticity. The reinforcement is used in a small volume and its distance from the neutral axis renders it particularly effective.

The combination of these three components enable the forming of members which are heat insulating, owing to the presence of the foam and the absence of thermal bridges, shock resistant because of the properties of the steel reinforcing members and the layered structure, and fluidtight because of the layered structure.

Sound insulation may be increased by the juxtaposition of an appropriate component on one of the faces.

The incorporation of the reinforcing metal members enables the thickness of the covering to be relatively small, all other things remaining constant.

The member is corrosion-proof. Members can be formed which are planar, curved or linear acting in bending (with or without shear stress) and/or in compression and/or in torsion.

The invention concerns plates and sheets including parallel reinforcing members, posts and beams with peripheral reinforcing members advantageously placed at an angle and possibly connected by frames and braces or yokes.

Such members according to the invention have a resistance to strains which is not provided by interior structures, as usual, but by the exterior portions, the interior acting as the body.

The members according to the invention enable the construction of members acting principally in bending such as for roofing, facings, gables, ceilings suitable for required loads, as well as members acting principally in compression and flexure such as walls, partitions, dividers, supports and finally members acting principally in tension and compression such as silos.

The design of these members may be carried out by conventional methods.

In an embodiment according to the present invention, the body is of extruded plastic material having a surface of a greater density than its interior such as can be obtained directly from an extrusion die. A flat construction member is therefore provided in which one of the faces formed has a surface of extruded plastic material with a greater density thus taking advantage of the particular properties thereof.

In the description which follows, made by way of example, reference will be made to the accompanying drawings, in which:

FIG. 1 shows a view in section of a panel according to the invention during its manufacture in an apparatus;

FIG. 2 shows a plan view of the upper face of the core with one of the grooves being filled;

FIG. 3 shows a view in section of a panel according to the invention;

FIG. 4 shows a view in section similar to FIG. 3 but for an alternative embodiment;

FIG. 5 shows a view in perspective with a portion in section of a further embodiment;

FIG. 6 shows a view of a slab according to the invention;

FIG. 7 shows a view in cross-section on a larger scale of a portion of the slab;

FIG. 8 shows a perspective view of a flooring member of a transport container;

FIG. 9 shows a perspective view of a body forming a part of a member according to the invention;

FIG. 10 shows a perspective view of reinforcing members for use in this member;

FIG. 11 shows a perspective view of a panel according to the invention;

FIG. 12 shows a perspective view of the same member but wiewed from the other face;

FIG. 13 shows a perspective view of a panel according to the invention for another embodiment;

FIG. 14 shows a partial view in cross-section of a silo according to the invention;

FIG. 15 shows a view in section taken along line 15—15 in FIG. 14 on a much larger scale;

FIG. 16 shows a view in cross-section of a vertical support or pole according to the invention;

FIG. 17 shows a view in section of a transport container panel according to the invention; and FIG. 18 is an horizontal section of a container panel for another embodiment.

Reference will be made to FIG. 1. On the wall 10 of a mould or table, after the application or a stripping agent, a layer 11 of an agent such as a gel coat or finishing agent is applied. One or more layers 12 of a glass fabric or web impregnated with resin, advantageously with non-solidified polyester resin is set on the layer 11. A plate 13 of expanded plastic material, advantageously polyvinyl chloride is placed on the layers 12.

The plate 13 has on its face 14, opposite its face 15 in contact with the layers 12, grooves 16 (FIG. 2) parallel to one another obtained by machining or in the course of manufacturing the plate.

In the grooves 16 are placed, without prestress, concrete reinforcing members 17 preferably with ribs or small projections as usual and without previous tension, in contradistinction to certain reinforced concrete techniques. On the face 14 are placed layers 19 of glass fabric or a web impregnated with non-solidified resin. The entire combination is then covered by a mould cover 20 having a face 21 in contact with the layers 19; the face 21 may have received a coating 22 of a finishing agent or gel coat.

According to a modification, the reinforcing members are disposed in the grooves after they are filled with resin, the resin impregnated cloth or mat being placed on the plate thus provided with reinforcing members.

In another modification, the second facing is effected in a second mould which covers the first mould after the completion thereof.

The moulding operation may include pressurization and increase of temperature.

After removal from the mould, a panel is obtained having structural characteristics which are clearly greater than those of known panels of the same type not having any reinforcing members. This result comes from the tightness of the bond between the reinforcing members and the coating(s) or covering(s) of the panel assured by the resin which is in continuous contact with the reinforcing members as well as with the glass fabric which in turn is intimately connected to the plate 13.

In another embodiment, the manufacture of the panel is effected without using a mould.

In another embodiment shown in FIG. 3 the panel comprises a core 23 of expanded polyvinyl chloride with a coating or covering 24 of polyester reinforced with glass fibres on one face and a coating or covering 26 of polyester reinforced with glass fibres on the other face 25, reinforcing members 28 being incorporated in the panel on the interior face 27 of the covering.

The face of the panel thus reinforced is the one intended to be subject to tension when the panel bends.

The presence of the reinforcing members also increases the strength of the panel in compression.

In the embodiment shown in FIG. 4 the panel 30 comprises a first series of parallel reinforcing members 31 incorporated in the covering 32 and the core and a second series of reinforcing members 33 incorporated in the covering 34 of the opposite face and the core.

In the embodiment shown in FIG. 5, the panel 40 comprises a core 41 of expanded polyvinyl chloride, a covering or facing 42 having parallel reinforcing members 43 incorporated according to the above described method. The other face of the core 41 is covered by a plate 44 of fibrocement, the facing 45 opposite the facing 42 being of polyester reinforced with glass fibres.

Such a panel is particularly useful as a paving slab.

Reference will now be made to FIGS. 6 and 7. The embodiment shown in these figures comprises a panel body 50 laterally flanked by two beams or ribs 51 and 52. The body 50 comprises a core 53 of expanded polyvinyl chloride which has a face 54 with parallel grooves or slots 55. Transverse reinforcing members 56 are housed in the grooves. The other face 57 of the core 53 has transverse grooves staggered relative to the grooves 55 and in which are arranged reinforcing members 58 having the same length as the reinforcing members 56.

A beam 51 comprises a first block 59 of expanded polyvinyl chloride which projects from the core 53 and a second block 60 also of expanded polyvinyl chloride. The first block has outer longitudinal channels 61 and 62 at its outer corners and the second block 60 has channels 63 and 64 in its outer corners. In the channels 61–64 are arranged reinforcing members 65–68, of the type used for reinforced concrete.

A coating or covering or skin 69 of polyester reinforced with glass fibres forms the outer surface of the member and also contributes to the connection between the core 53 and the reinforcing members 56 and 58 as well as between the blocks 59 and 60 and the reinforcing members 65–68. The polyester resin and the glass fibres covering the reinforcing members also contribute to the connection of the reinforcing members with the adjacent block of expanded polyvinyl chloride.

Such a construction member is particularly useful as a slab.

Reference will now be made to FIG. 8. In this embodiment the panel 71 per se comprises a core 72 of expanded polyvinyl chloride with longitudinal reinforcing members 73 incorporated in the said core and the covering, (removed in the Figure), on one face and longitudinal reinforcing members 74 staggered relative to the reinforcing members 73 arranged on the other face.

Cross beams 75 have cores 76 of expanded polyvinyl chloride (assumed transparent in the figure), and these beams are connected to the panel 70 by a covering or coating of resin reinforced with glass fibres. In the outer cores of the beam 75 are disposed reinforcing members 77 and 78 incorporated in the core 76 and the covering 79 as previously indicated.

The reinforcing members of the type used for reinforced concrete may also be provided in the inner corners of the beams 75.

Such a construction member is particularly useful as a container flooring member.

The construction member according to the invention is useful as a rule in all the cases where panels are presently employed having a core of laminate wood with faces covered by a covering of plastic material reinforced with glass fibres, for example for the construction of transport containers which are more and more wide-spread in the field of ground or sea transport. For the same strength, the panels according to the invention are approximately half as heavy as such laminated panels without the production cost being increased.

The member according to the invention may also be used in the construction of panels, doors, gables, roofs, for forming slabs, roofing materials, buildings and housing units, for the construction of hatchways for refrigerated boats, vehicle flooring, etc.

Its superior structural features thereby enable the use of panels having a lesser thickness.

In a modification, the core is of an expanded plastic material other than polyvinyl chloride, for example, polyurethane or polystyrene or a phenolic foam.

The expanded plastic core may be formed in situ.

Reference will now be made to FIGS. 9–12. The body 101 is an article of thermoplastics material such as obtained by extrusion with a relatively thin outer layer 102 superficially hard and strong of non-expanded material whereas the interior is of expanded or foam material.

Parallel grooves 104 with semi-circular cross-sections are formed on one of the faces of the body 101 from extrusion or by subsequent operation with milling cutters.

Reinforcing members 105 of the type used in reinforced concrete, preferably having small projections 106, are disposed in the grooves 104. At the outset the reinforcing members 105 are coated in a mixture of hardenable resin and fibres, preferably glass fibres, or the grooves are filled with such a mixture before the reinforcing members are arranged therein.

On the body 101 thus formed is applied a composition comprising a hardenable resin with glass fibres. The fibres may constitute one or more layers. It is left to harden. The hardened resin is not only intimately bonded to the fibres but also with the reinforcing members 105 and the body 101. A construction member is thus obtained having exceptionally increased structural strength which comes from the qualities of the body 101 having a hard layer 102 as well as the reinforcing members and the outer composite layer 107 resulting from the hardening of the resin with glass fibres.

In order to manufacture panels of larger dimensions, a certain number of bodies $101_1$ and $102_2$, etc. are disposed side by side (FIGS. 11 and 12). After being provided with reinforcing members 105, resin is put between the adjacent edges and a composite covering is then provided which not only ensures the reciprocal incorporation of the reinforcing members 105 in the bodies 101 and the coating 107 but also contributes to the joining of the juxtaposed bodies to one another in order to obtain a panel of the desired width.

The manufacturing apparatus may comprise a table on which is applied a gel coat, then the resin, then glass fabric or webs, finally the previously extruded article provided with reinforcing members which comes into contact with the resin.

The combination is then put under pressure, for example, by the application of a plastic sheet under vacuum conditions.

In certain cases the polymerization is accelerated by heating.

The panel has excellent structural characteristics in addition to the qualities of the extruded article itself. Its manufacture is simple and its production cost is low.

The members according to the invention may be used for the construction of walls for transport containers, railway cars, or all other vehicles, also for constructing vehicles and constructing flooring, roofs, doors and walls, etc..

Reference will now made to FIG. 13. In this embodiment the construction member comprises a panel 111 formed as has been indicated by the juxtaposition of a plurality of members 101 with reinforcing members 105, the composite covering of resin and glass fibres being further applied for the bonding of the panel with a body 112 of lighter material and having greater thermal and sound insulation characteristics, for example expanded polyvinyl chloride.

Reference will now be made to FIGS. 14 and 15 which show a silo formed from members each comprising a body 201 of expanded plastic material having an annular cylindrical shape with a covering on its outer and inner faces 202 and 203 respectively composed of a resin reinforced with fibres such as glass fibres. The member has for reinforcements an outer reinforcing member 204 arranged as a helix at the junction between the covering 202 and the body 201 and bonded to the body and to the covering by the resin itself which forms part of the covering.

This construction may also comprise an inner reinforcement comprising a reinforcing member 205 formed as a helix and arranged at the connection between the body 201 and the covering 203 and bonded thereto by the resin itself which forms the covering.

Reference will now be made to FIG. 16 relative to a pole or vertical post for use, for example, for supporting electric or telephone lines. The pole 201 comprises a body 210 of expanded plastic material shaped as a prism, for example, with a square cross-section, and having a covering 211 of a resin with glass fibres on its lateral faces. At the corners of the post in the connecting zone between the body 210 and the covering 211 are arranged vertical reinforcing members 212–215 which are bonded to the body 210 as well as to the covering 211 by the resin of which the covering is formed.

Reference will now be made to FIG. 17 which schematically illustrates in section a panel intended to constitute the wall of a transport container. According to the invention the reinforcing members 220 provided at the connection between the body of expanded plastic material of the panel and one or both of the two coverings of a resin with glass fibres are distributed in a way as to correspond to the forces to which the panel is to be subjected. Accordingly, in a central zone 221 therein the reinforcing members are very close together and in two marginal zones 222 and 223 the reinforcing members are not quite so close together as in the central zone, spaces being also provided between the zones 222 and 223 and the zone 221 having the reinforcing members relatively spaced apart. A panel is thus provided which is of exceptional lightness in spite of its very high structural strength.

In all cases the reinforcing members or rods may have non-circular cross-sections.

In the embodiment shown in FIG. 18, the reinforcing members have an elongated cross-section, rectangular or elliptical as shown at 230 and the reinforcing members have a helicoidal rib 231. Each member, in this embodiment is in contact relationship with one and the other external coating or skin 233 and 234 in its opposite apex zones 235 and 236. The body or core 237 of the element is of expanded polyvinyl chloride. The resin of the composite material made of glass fibres and resin, which is part of the coatings ensures the rigidity of said material both in the core 237 and members 230.

Such a wall presents, with small thickness, a particularly good resistance.

It is advantageously used for the manufacture of containers.

In the embodiments contemplated for the construction of parts for which fire proofness is required, the invention contemplates phenolic resins for the constitution of the coatings or skin.

Panels according to the invention can be made in various thickness from 12–15mm up to 15 cm or more.

The expanded plastic material constituting the core of the panel has a density of 0.03 to 0.15 the compression, shear or tension resistance strength being between 1–2 kg/cm$^2$ and about 10 kg/cm$^2$.

The thickness of a covering or skin is about 1 to 2 mm.

The weight of a panel having a thickness between 15 mm and 2–3 cm is less than 10 kg/m$^2$.

If necessary, panels of very great surface areas, up to 50 m long and 2.5 m width can be manufactured.

What I claim is:

1. A construction element comprising a core of expanded resin material having a hardened foam structure with an outer peripheral surface, said core being substantially homogeneous and having little compressive strength, said core defining a a pre-formed recess extending longitudinally thereof at said peripheral surface, a covering of resin material reinforced with fibres bonded on said outer peripheral surface of said core and extending into said recess thereof, said covering having an outer surface opposite said outer peripheral surface of the core, and an elongated metal reinforcing bar disposed in said recess to substantially fill the same and be at the junction between the covering and said outer peripheral surface of the core in substantial proximity to the outer peripheral surface of the element, said bar being non-pretensioned and extending substantially coextensive in length with the core, said recess being relatively shallow in relation to the bar such that the covering of resin material forms a relatively uniform thin skin extending over the entire peripheral surface of the core inclusive of said bar, said bar being bonded to the covering and thereby to said core by the resin of said covering.

2. A construction element as claimed in claim 1 wherein said pre-formed recess is a groove in the peripheral surface of the core.

3. A construction element as claimed in claim 1 wherein said fibers are glass fibers.

4. A construction element as claimed in claim 2 wherein said fibers are glass fibers, a layer of said fibers impregnated with resin being arranged at the bottom of the groove.

5. A construction element as claimed in claim 1 wherein a plurality of said recesses are provided in said core, said recesses being substantially parallel, a plurality of said reinforcing bars being provided, one in each recess.

6. A construction element as claimed in claim 1 wherein said core has opposite outer surfaces and is provided with one of said coverings on each opposite peripheral surface with reinforcing bars at both junctions of the core with said coverings.

7. A construction element as claimed in claim 1 wherein said construction element is annular in shape and said reinforcing rod is helically wound in said element.

8. A construction element as claimed in claim 5 comprising a second of said coverings on said core on the inner peripheral surface thereof, and a second helically wound reinforcing bar in a recess provided at the inner peripheral surface of said core.

9. A silo comprising at least one construction element according to claim 8.

10. A construction element as claimed in claim 1 of slab shape wherein a plurality of said reinforcing rods are mounted in respective of said recesses at said outer peripheral surface of the core, and further comprising a fibrocement plate bonded to said core on the face thereof opposite that containing the reinforcing rods.

11. A transport container formed of panels each comprising a construction element as claimed in claim 1.

12. A slab comprising a panel including a construction element as claimed in claim 5, said panel having opposite edges, beams mounted along said edges of the panel and integral therewith, said beams including bodies of expanded resin material having an outer surface and provided with corners, second reinforcing bars at said corners of the beam, and a covering of resin material reinforced with fibers bonded to said bodies on the outer surface thereof and bonding said second reinforcing bars to said bodies and to said covering.

13. A flooring member comprising a panel including a construction element as claimed in claim 1, and cross beams on one face of said panel having cores of expanded resin material with second reinforcing bars therein.

14. A construction element as claimed in claim 1 wherein said reinforcing bars are of the type used for reinforced concrete.

15. A panel comprising a plurality of construction elements as claimed in claim 1 in juxtaposed relation, the covering of resin and reinforcing fibers being common to the justaposed elements and assembling the same.

16. A pole for carrying electric power or telephone lines comprising a construction element as claimed in claim 1 of elongated shape.

17. A pole as claimed in claim 16 wherein said construction element has a cross-section of prism shape with one of said reinforcing bars being mounted in a recess provided at each of the edges of said prism.

18. A construction element as claimed in claim 1 wherein the core of resin material has a density of about 0.03 to 0.15 and a compression strength less than 10 Kg/cm².

* * * * *